United States Patent [19]

Di Bernardo et al.

[11] Patent Number: 5,691,477
[45] Date of Patent: Nov. 25, 1997

[54] TORSIONAL VIBRATOR

[75] Inventors: Carlo Di Bernardo, Milan; Giuseppe Matrascia, Seregno, both of Italy

[73] Assignee: Pirelli Coordinamento Pneumatici, S.p.A., Milan, Italy

[21] Appl. No.: 752,260

[22] Filed: Nov. 18, 1996

[30] Foreign Application Priority Data

Nov. 21, 1995 [IT] Italy .................. MI95A2400

[51] Int. Cl.$^6$ .................................................. G01M 3/32
[52] U.S. Cl. .................................................. 73/662
[58] Field of Search ........................ 73/496, 517 AV, 73/517 B, 518, 662, 663, 664, 672

[56] References Cited

U.S. PATENT DOCUMENTS

| | | | |
|---|---|---|---|
| 4,446,734 | 5/1984 | Empson | 73/672 X |
| 4,787,265 | 11/1988 | Mishiro | 74/574 |
| 4,825,692 | 5/1989 | Rohs et al. | 73/662 X |
| 4,875,171 | 10/1989 | Fujioka et al. | 73/496 X |
| 4,989,158 | 1/1991 | Sloane | 73/664 X |
| 5,033,302 | 7/1991 | Monch | 73/672 X |
| 5,063,321 | 11/1991 | Carter | 310/323 |
| 5,083,463 | 1/1992 | Marshall et al. | 73/663 |
| 5,543,956 | 8/1996 | Nakagawa et al. | 359/225 |

FOREIGN PATENT DOCUMENTS

| | | |
|---|---|---|
| 0429785 | 6/1991 | European Pat. Off. |
| 1081879 | 12/1954 | France |

OTHER PUBLICATIONS

P.W.A. Zegelaar et al, "Tyre Models for the Study of In-Plane Dynamics" The Dynamics of Vehicle on Roads and on Tracks, Supplement to Vehicle System Dynamics, vol. 23, pp. 578–590 (1994).

*Primary Examiner*—Elizabeth L. Dougherty
*Attorney, Agent, or Firm*—Watson Cole Stevens Davis, P.L.L.C.

[57] ABSTRACT

A torsional vibrator comprises a direct-current electric motor provided with induced windings supplied with direct current through inverter means capable of changing their polarity in an alternating manner with a preselected frequency. To a shaft of the electric motor a wheel is made integral that is formed by a rim and by a tire and acceleration transducers are associated with the rim and with the tire of the wheel. The shaft of the motor is driven to execute angular oscillations that torsionally excite said wheel and cause it to vibrate in rotational direction. The acceleration transducers detect rotational vibrations and provide measurements of acceleration of the rim and of the tire.

6 Claims, 2 Drawing Sheets

TORSIONAL VIBRATOR

BACKGROUND OF THE INVENTION

1. Field of the Invention

The present invention relates to a torsional vibrator capable of torsionally exciting a tire of a wheel and of providing measurements of angular acceleration.

Such measurements of angular acceleration allow the determination of the torsional foundation stiffness of the tire, which is a concentrated parameter that represents the pneumatic stiffness of sidewall and carcass of the tire, with the tire inflated, that is to say the stiffness between the tread strip+belts+carcass and rim of a wheel.

2. Description of Background

P. W. A. Zegelaar et al. in "Tyre Models for the Study of In-Plane Dynamics", The Dynamics of Vehicle on Roads and on Tracks, Supplement to Vehicle System Dynamics, Volume 23, 1994" describe an apparatus for measuring the foundation stiffness of a tire of a wheel. The tire, fastened to a rim of the wheel, is constrained within a "circular casing" and a static torque is applied to the rim. From the measurement of the angle of rotation of the rim the torsional foundation stiffness of the tire is obtained.

This apparatus provides a measurement of a static type that represents only with a certain approximation the foundation stiffness of the tire under dynamic conditions, operating on the road.

SUMMARY OF THE INVENTION

The object of the present invention is a torsional vibrator that allows the determination of the torsional foundation stiffness of a tire by means of measurements of a dynamic type.

The above mentioned object is achieved, according to the invention, with a torsional vibrator comprising a direct-current electric motor provided with inductor windings, with induced windings and with a shaft with which a wheel is made integral that comprises a rim and a tire, first acceleration transducer means associated with (functionally fastened to) said rim, second acceleration transducer means associated with (functionally fastened to) said tire, said induced windings being connected to means for supplying direct-current power through inverter means capable of changing the polarity of said induced windings in an alternating manner with a preselected frequency so that said shaft is driven to execute angular oscillations that torsionally excite said wheel, causing it to vibrate in rotational direction, said first and second acceleration transducer means detecting rotational vibrations and providing measurements of acceleration of said rim and of said tire.

The vibrator provides a torque of the "random" type (containing a high number of frequencies) to the wheel with the tire and the transducer means provide measurements of the angular acceleration of the rim and of the wheel. The ratio between the two angular accelerations, depending on the frequency of excitation, provides a transfer function between output (angular acceleration of the tire) and input (angular acceleration of the rim), that exhibits a resonance peak (maximum) at the natural rotational frequency of the tire. If, then, the transfer function is known as to amplitude and phase, within the selected range of frequency, preferably 0–200 Hz, and if the moment of inertia of the tire is also known (measured, for example, with a torsional pendulum), it is possible to make a mathematical calculation of the torsional foundation stiffness Cbt of the tire.

BRIEF DESCRIPTION OF THE DRAWINGS

Features and advantages of the invention will now be illustrated with reference to an embodiment thereof represented as a non-limiting example in the enclosed figures, wherein.

DESCRIPTION OF THE PREFERRED EMBODIMENTS

Figure 1:
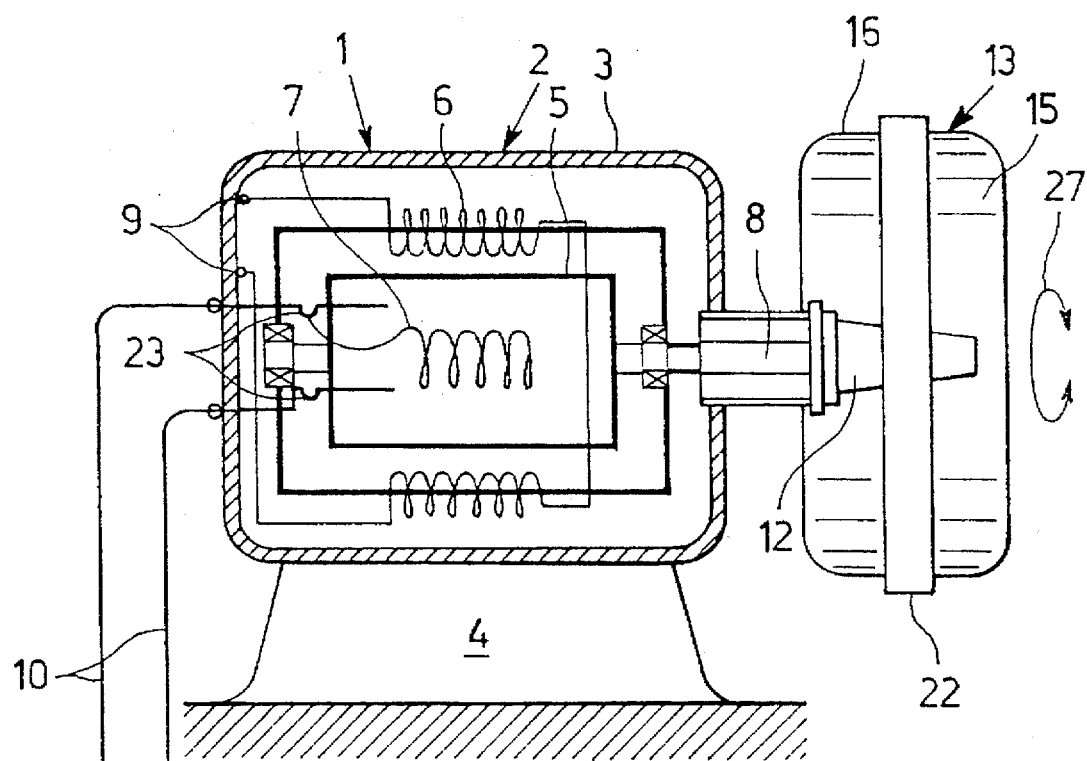
FIG. 1 is a side view, in partial cross-section, of a torsional vibrator according to the invention.
Figure 2:
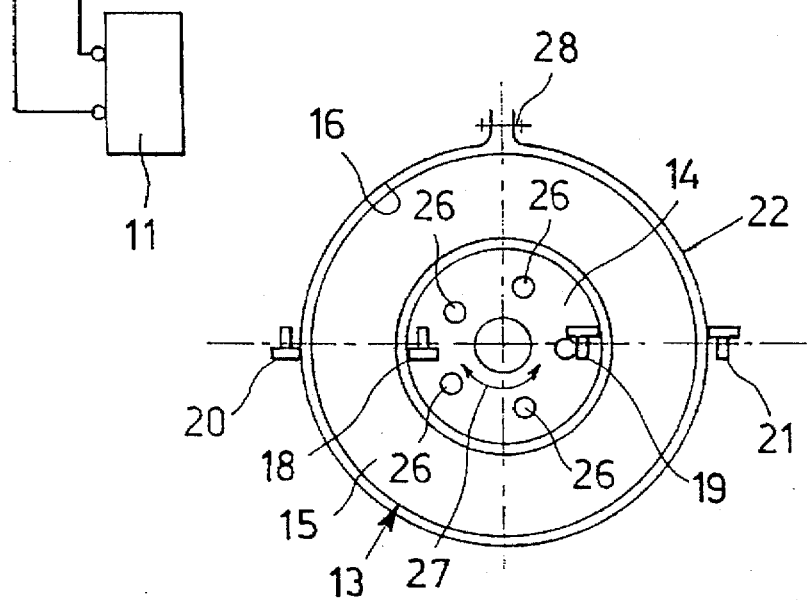
FIG. 2 is a front view of the torsional vibrator of FIG. 1.

In FIGS. 1 and 2 there is shown diagrammatically a torsional vibrator 1 made according to the invention comprising an electric motor 2 of the direct-current type. The motor 2, in turn, comprises a carcass, or stator, 3 fastened to a supporting structure 4, inducer windings 6 and induced windings 7 supported by a rotor 5. The rotor 5 is keyed rigidly on a shaft 8, rotatably supported by the carcass 3. The inducer windings 6 are connected to a direct-current power supply unit at a stabilized voltage, not shown, by means of terminals 9. The induced windings 7 are connected to the direct-current power supply by means of collectors 23, conductors 10 and inverter means 11 capable of changing the polarity of the windings 7, and thus of the induced magnetic field, in an alternating manner (sinusoidal) with a preselected frequency ranging from 1 Hz to 200 Hz. The inverter means 11 can consist of high-power drives to alternate the polarity even at a high frequency.

On the shaft 8 there is rigidly keyed a hub 12 provided with a flange on which there is fastened, by means of bolts 26, a rim 14 (FIG. 2) of a wheel 13. The wheel 13 comprises a tire 15 provided with a tread 16. Two acceleration transducers 18 and 19, consisting of linear accelerometers, are fastened to the rim 14 in a diametrically opposite position, and two acceleration transducers 20 and 21, consisting of linear accelerometers, are fastened to the tire 15 in a diametrically opposite position by means of a clamp 22, closed by a screw 28, that holds the tread 16 circumferentially.

When the torsional vibrator 1 is in operation, the induced windings 7 are supplied with direct-current in an alternating manner through the inverter means 11 so that in the motor 2 a rotating magnetic field is generated that changes direction of rotation alternately. The driving shaft 8 performs angular oscillations (arrow 27) and torsionally excites the wheel 13 that thus vibrates in a rotational direction. The accelerometers 18, 19, 20 and 21 detect rotational vibrations and provide measurements of angular acceleration of the rim 14 and of the tire 15, that is of the tread strip+belts+carcass.

The torsional vibrator 1 provides a torque of the "random" type (containing a high number of frequencies) to the wheel with the tire. In particular, the frequencies at which the driving shaft 8, and thus the wheel 13, vibrates torsionally, are linked to the frequencies of inversion of the rotating magnetic field. Thus, a rotational electric vibrator is available that allows to exite the tire 15 torsionally in the range of frequencies that is desired.

The measurements that are performed by means of the linear accelerometers 18, 19, 20 and 21 are the linear acceleration of the rim 14 and that of the tire 15. From the linear acceleration of each accelerometer 18 or 19, on the rim 14 a calculation is made, given the latter's distance from the center of the wheel, of the angular acceleration of the rim, an average is then calculated of the measurement provided by the two accelerometers 18 and 19. The same procedure is carried out for the two accelerometers 20 and 21 on the tread 16 of the tire. Calculating the ratio between the angular acceleration of the tire 15 and that of the rim 14 (taken as an input), a transfer function in amplitude and phase is obtained, depending on the frequency of excitation.

The Applicant has made a torsional vibrator like the one described wherein the motor 2 has a rating of 1.47 kW and a speed of 3,000 rpm.

Figure 3:
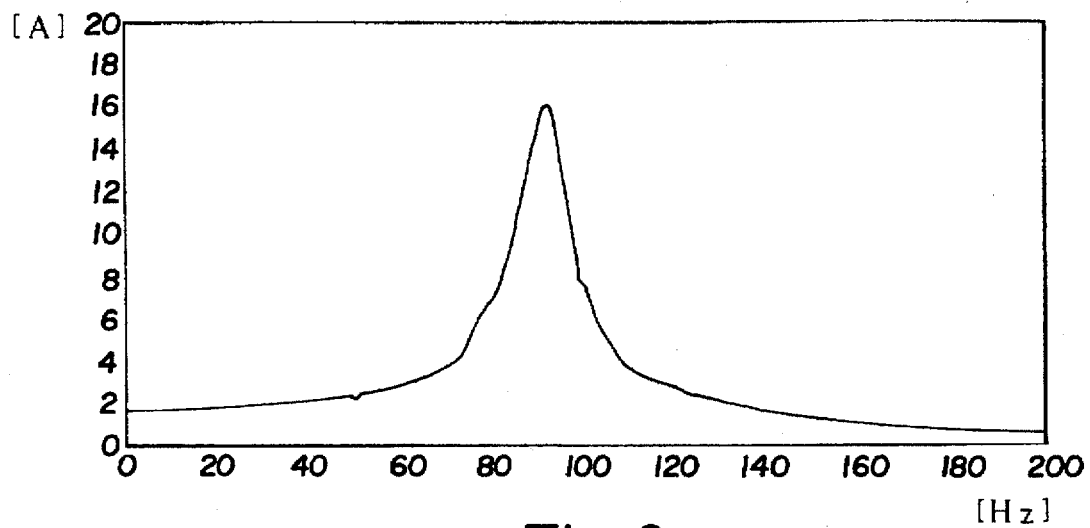
FIGS. 3 and 4 are graphs that show amplitude and phase of a transfer function against changes in the frequency of excitation for a wheel torsionally excited with the vibrator according to the invention.
Figure 4:
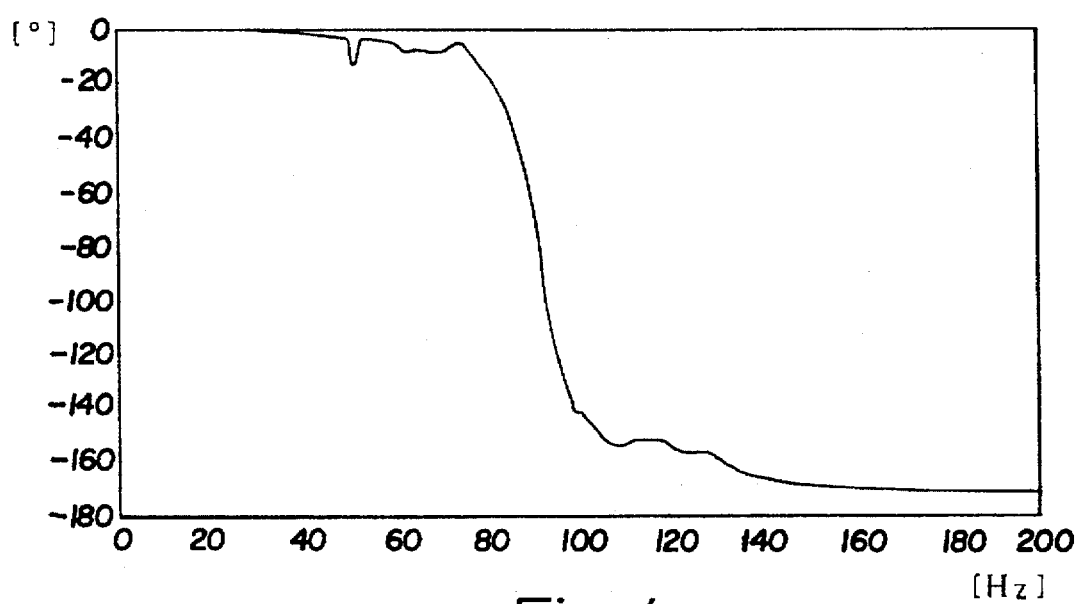

There is shown in FIGS. 3 and 4 a plotting of the amplitude A and of the phase 0° (degrees) of a transfer function against the frequency of excitation (Hz). The transfer function is obtained from the ratio between angular acceleration of the rim and angular acceleration of the tire of a wheel torsionally excited with the torsional vibrator 1. The tire subjected to test is of the type P 6000, size 185/60 R 14, with an inflation pressure p=2 bar.

Once the transfer function between the two angular accelerations is known, that shows a resonance peak at the natural torsional frequency of the tire, it is possible to obtain mathematically, applying the formulas of the dynamic systems with one degree of freedom, the torsional foundation stiffness of the tire Cbt. For the calculation, it is necessary to know the moment of inertia of the tire, that is determined experimentally, for example with a torsional pendulum, not shown as it is known.

It is observed that the measurement of the torsional stiffness is of a dynamic type (frequency response of the tire) and not static.

Instead of the linear accelerometers 18, 19, 20 and 21 angular accelerometers can be used.

We claim:

1. A torsional vibrator comprising a direct-current electric motor provided with inductor windings, with induced windings and with a shaft with which a wheel is made integral that comprises a rim and a tire, first acceleration transducer means fastened to said rim, second acceleration transducer means fastened to said tire, said induced windings being connected to means for supplying direct-current power through an inverter for changing the polarity of said induced windings in an alternating manner with a preselected frequency, so that said shaft is driven to execute angular oscillations that torsionally excite said wheel, causing the wheel to vibrate in a rotational direction, said first and second acceleration transducer means detecting rotational vibrations and providing measurements of acceleration of said rim and of said tire.

2. A torsional vibrator according to claim 1, wherein frequency ranges from 1 Hz to 200 Hz.

3. A torsional vibrator of claim 1, wherein said first accelerator transducer means is directly fastened to said rim and said second accelerator transducer means is directly fastened to said tire.

4. A torsional vibrator comprising a direct-current electric motor provided with inductor windings, with induced windings and with a shaft with which a wheel is made integral that comprises a rim and a tire, first accelerometer fastened to said rim, second accelerometer fastened to said tire, said induced windings being connected to means for supplying direct-current power through an inverter for changing the polarity of said induced windings in an alternating manner with a preselected frequency, so that said shaft is driven to execute angular oscillations that torsionally excite said wheel, causing the wheel to vibrate in a rotational direction, said first and second acceleration transducer means detecting rotational vibrations and providing measurements of acceleration of said rim and of said tire.

5. A torsional vibrator of claim 4, wherein said first accelerometer is directly fastened to said rim and said second accelerometer is directly fastened to said tire.

6. A torsional vibrator of claim 5, wherein said first accelerometer is a linear accelerometer and said second accelerometer is a linear accelerometer.

* * * * *